US006272086B1

(12) United States Patent
Jaquette et al.

(10) Patent No.: US 6,272,086 B1
(45) Date of Patent: Aug. 7, 2001

(54) LOW COST TAMPER-RESISTANT METHOD FOR WRITE-ONCE READ MANY (WORM) STORAGE

(75) Inventors: Glen Alan Jaquette; Leonard George Jesionowski; John Edward Kulakowski; Judson Allen McDowell, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/976,209

(22) Filed: Nov. 18, 1997

(51) Int. Cl.[7] ........................................................ G11B 5/09
(52) U.S. Cl. .................. 369/53.21; 369/13; 369/47.5; 369/275.3
(58) Field of Search ................ 369/47, 48, 54, 369/58, 13, 53; 360/48; 711/112, 100, 170

(56) References Cited

U.S. PATENT DOCUMENTS

| 5,132,954 |   | 7/1992  | Kulakowski et al. | 369/48  |
|-----------|---|---------|-------------------|---------|
| 5,181,162 |   | 1/1993  | Smith et al.      | 364/419 |
| 5,226,161 |   | 7/1993  | Khoyi et al.      | 395/650 |
| 5,233,576 | * | 8/1993  | Curtis et al.     | 369/13  |
| 5,261,080 |   | 11/1993 | Khoyi et al.      | 395/500 |
| 5,297,115 | * | 3/1994  | Poon et al.       | 369/47  |
| 5,418,767 | * | 5/1995  | Gaudet et al.     | 369/58  |
| 5,940,854 | * | 8/1999  | Green, Jr. et al. | 711/112 |

OTHER PUBLICATIONS

Jeff Taylor, "SCSI grows up: New options boost interface performance", *Data Storage*, Jan. 1996, pp. 41–46.

* cited by examiner

Primary Examiner—Thang V. Tran
(74) Attorney, Agent, or Firm—Dan Hubert & Assoc.

(57) ABSTRACT

A tamper-resistant Hard-WORM data storage system and a magneto-optical storage disk therefor is disclosed. The disk has a plurality of sectors thereon containing one or more uniquely formatted fields to provide an indication that the disk is a Write-Once Read Many (WORM) disk. A motor is provided in the storage system for rotating the disk at an operational rotational speed and a laser read/write (R/W) head unit is provided for reading and writing information in the sectors. A read/write (R/W) control unit within the storage system controls read and write operations on the disk in response to commands from an external data processing device, such as a computer. The R/W control unit is adapted to decode the one or more uniquely formatted fields in order to read and correctly interpret information contained therein. In an additional aspect of the disclosure, the R/W control unit disables erase operations in sectors containing uniquely formatted fields but allows such operations in sectors that do not contain such fields in order to permit calibration testing and the maintenance of media defect lists, first available sector lists and the like.

29 Claims, 4 Drawing Sheets

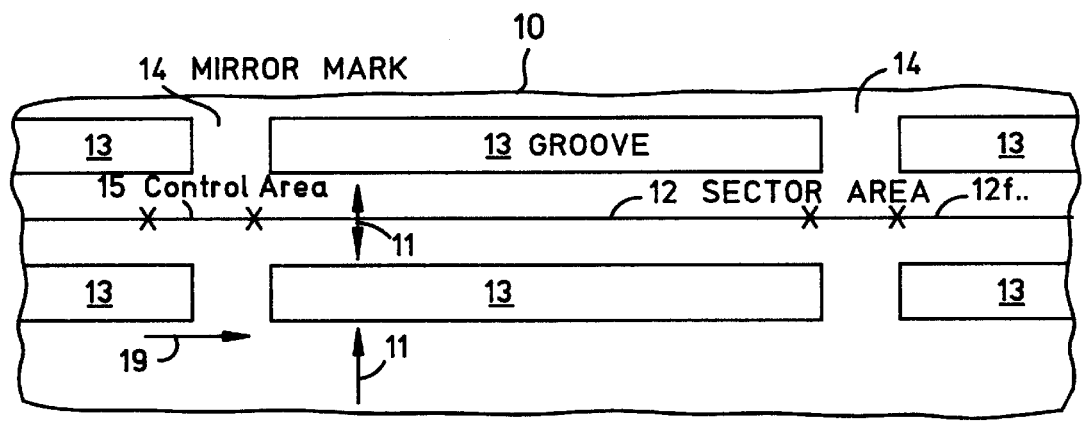
FIG. 1A
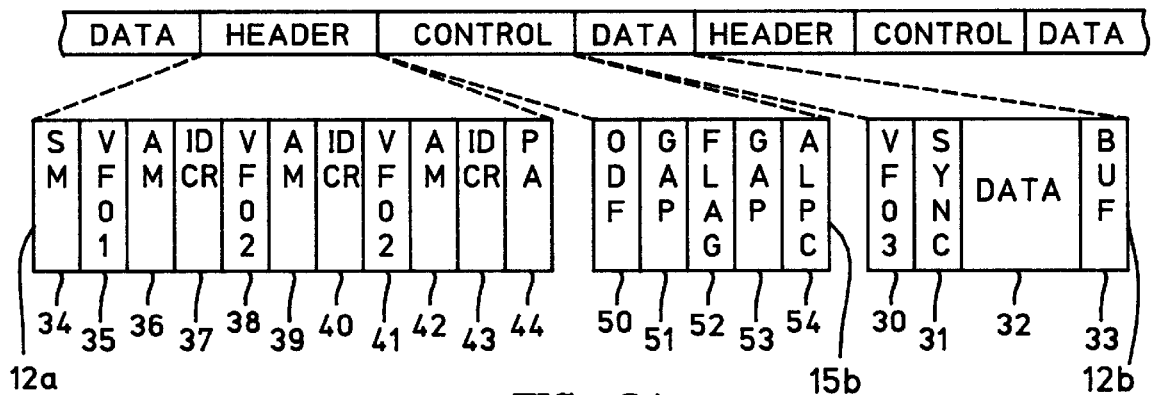
FIG. 2A
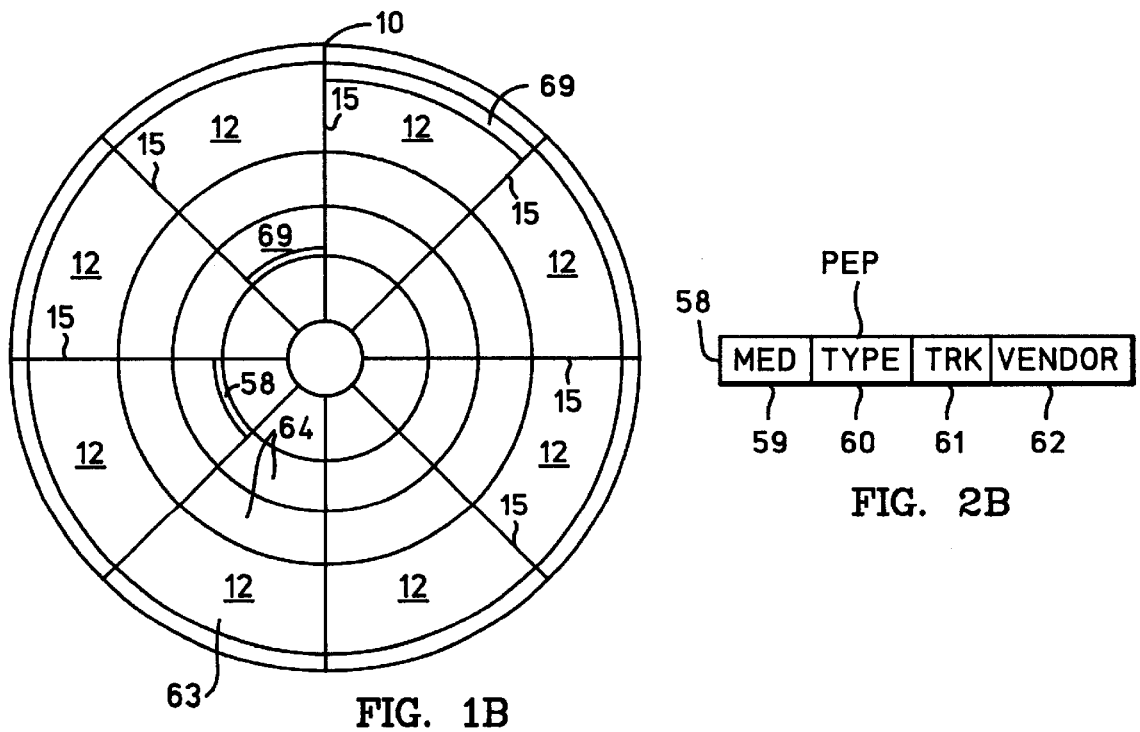
FIG. 1B
FIG. 2B

LOW COST TAMPER-RESISTANT METHOD FOR WRITE-ONCE READ MANY (WORM) STORAGE

BACKGROUND OF THE INVENTION

1. Field of the Invention

The present invention is directed generally to data storage in a computerized data processing system, and more particularly, to the recording of archive storage volumes using optical media in a cost efficient manner designed to maximize tamper resistance and ensure a high degree of certifiability.

2. Description of the Related Art

A common practice in computer data processing environments (from very small home computers to very large enterprise computers) is to store data sets (e.g. data and program files) onto removable optical media, including disks recorded using rewritable and Write-Once Read Many (WORM) techniques. Usually, these data sets are copied or moved to the optical media from a direct access storage device (DASD), such as a disk drive, as part of a migration, backup or archive operation.

Rewritable optical disks are used in data processing enterprises for space management and data backup operations. Space management includes data migration, which is the act of moving infrequently used data sets from primary storage to migration storage. Backing up is the act of periodically copying data sets, or portions thereof, from primary storage to backup storage in order to create one or more backup versions of the data sets which can be recovered following a disaster event. Rewritable optical media are used for migration and backup because the data sets recorded thereon usually become obsolete, and the migration and backup disks can be reused to record new migration and backup data. The prevailing rewritable optical disk technology used today is Magneto-Optical (MO) recording. MO disks have surfaces with fixed magnetic domains therein that change the polarization direction of an incident laser beam to produce a modulated return beam containing the information recorded on the media. When it is desired to write new information to the disk, the laser power is increased so as to heat the media to a point where the magnetic domains can be altered by an external magnetic field, but not so high as to ablate the media.

WORM disks are used in data processing enterprises for data archival. Archival is the act of saving a specific version of a data set (e.g., for record retention purposes) for an extended period of time. The data set is placed in archive storage pursuant to command by a user or data processing administrator. Archived data sets are often preserved for legal purposes or for other reasons of importance to the data processing enterprise. It is therefore important that archived data volumes be capable of certification, meaning that automatic machine procedures are in place for certifying that the data sets written to the archive volume have not been altered or rewritten. Disks recorded according to WORM techniques, are often used for archival purposes because they can be written only once. There are two distinct methods being offered in the marketplace for WORM recording: WORM using ablative media, and Continuous Composite Write-once (CCW) using magneto-optical media.

Ablative WORM disks are recorded using a high power laser beam which permanently ablates the media to form small pits which alter the reflectance of the media surface. When an incident laser beam (at a lower power level during read mode than during write operations) is focused on the media, there is produced an intensity modulated return beam containing the information recorded on the media. Ablative WORM thus provides a permanent audit trail of archived data based on the ablative nature of the recording media. In contrast to Continuous Composite Write-once (CCW) uses a magneto-optical media and an optical data storage device that allows the media to be convertible from re-writable to read-only using drive firmware. Each media recording surface has a media descriptor table contained within a control track which defines the media as a unique media type. Previously manufactured drives will not recognize the media type, and therefore, will not read or write the media. The data on the media is therefore protected from being destroyed by such drives. There is also a storage state indicator within each sector of each track of the media that defines whether the sector is writable or read-only. When the indicator is in the "off" state the sector may be written. The writing process changes the state of the indicator to "on" or "read only," which prevents any further writing on the sector.

Ablative WORM technology has been successfully marketed as superior to CCW technology due to the built-in tamper-resistant protection of the ablative media versus the perceived tamperable protection offered by CCW drive firmware. However, the use of ablative technology has disadvantages with respect to the development time, development expense, and unit cost required for the drive and the media.

Accordingly, a superior method is required for WORM data storage. What is required is a storage methodology that reduces the substantial costs of ablative WORM yet provides greatly improved tamper resistance over CCW technology.

SUMMARY OF THE INVENTION

In view of the foregoing, the principal object of the present invention is to provide an improved data storage system employing WORM technology for producing certified data set storage volumes.

Another object of the present invention is to provide an improved data storage system in which WORM technology is employed without the high costs of ablative worm technology.

Another object of the present invention is to provide an improved data storage system in which WORM technology is employed at the cost of CCW technology but with greatly improved tamper resistance.

Another object of the present invention is provide an improved data storage system in which WORM technology is employed in a manner that prevents reading or writing by nonconforming drives.

Another object of the present invention is provide an improved data storage system in which WORM technology is employed in a manner that prevents conforming drives from writing data to user data areas that have previously been written but which allows write calibration test areas, media defect lists, and first available sector lists to be maintained.

Another object of the present invention is provide an improved data storage system in which WORM technology is employed in a manner that prevents undetected modification of data by bulk copying, bulk erasing and bulk recopying of the media.

These and other objects are accomplished by a tamper-resistant Hard-WORM data storage system and a Hard- WORM magneto-optical storage disk therefore The data storage system mounts and accesses the Hard-WORM magneto-optical disk, which has a plurality of sectors thereon and contains one or more uniquely formatted fields to provide an indication that the disk is a Write-Once Read Many (WORM) disk. A motor is provided in the storage system for rotating the disk at an operational rotational speed and a laser read/write (R/W) head unit is provided for reading and writing information in the sectors. A read/write (R/W) control unit within the storage system controls read and write operations on the disk in response to commands from an external data processing device, such as a computer. The R/W control unit is adapted to read and correctly interpret information contained in the one or more uniquely formatted fields. In an additional aspect of the invention, the R/W control unit disables erase operations in sectors containing uniquely formatted fields but allows erase operations in sectors that do not contain such fields in order to permit calibration testing and the maintenance of media defect lists, first available sector lists, and the like.

BRIEF DESCRIPTION OF THE DRAWINGS

The objects, advantages and features of the present invention will be more clearly understood by reference to the following detailed disclosure and the accompanying drawings in which:

FIG. 1A is a diagrammatic plan view of a portion of a Hard-WORM optical disk constructed in accordance with the present invention;

FIG. 1B is a top plan view of the optical disk of FIG. 1A;

FIG. 2A illustrates an information format for header, control, and data areas in a track of the optical disk of FIGS. 1A and 1B;

FIG. 2B illustrates a format for a phase-encoded portion written on the optical disk of FIGS. 1A and 1B;

DETAILED DESCRIPTION OF THE PREFERRED EMBODIMENTS

Figure 3:
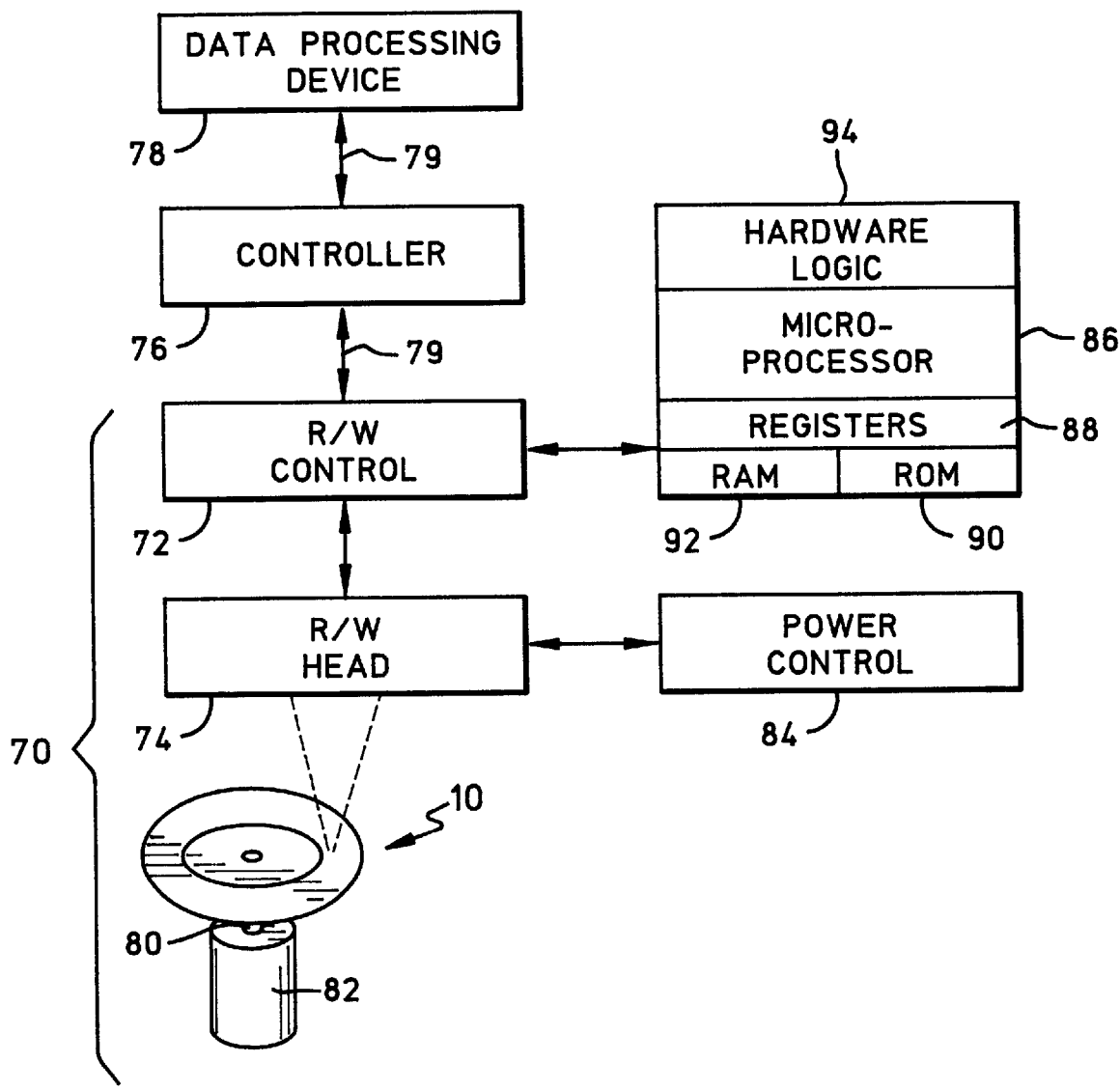
FIG. 3 is a plan view of an optical storage device for reading and/or writing data to the optical disk of FIG. 1.

Referring now to the drawings wherein like reference numerals designate like or similar parts throughout the several views, there is illustrated in FIGS. 1A and 1B a magneto-optical disk 10 having a spiral track 11 on each of its recording surfaces. In the preferred embodiment, the spiral track 11 can be divided into a plurality of radial zones. In each zone, the spiral track 11 has a plurality of substantially circular track portions. In order to guide an optical beam along the longitudinal or circumferential extent of the track 11, guide grooves 13 are disposed on radially opposite sides of the track 11. Each sector area 12 is a signal storing area of the disk 10 having any one of a plurality of possible signal formats. Extending radially of the disk 10 between the longitudinal ends of the guide grooves 13 are mirror marks 14, which are a part of a control area portion 15 of the track 11. User data is not stored in the control area 15. Rather, control area 15 is used for control purposes. The mirror marks 14 are formed as a continuous first surface on the recording surface of the disk 10 that is uninterrupted radially by any of the guide grooves 13.

Referring now to FIGS. 1A, 1B, and 2A, formats for a sector area 12 and for a control area 15 are described. These formats are shown as examples only, it being understood that industry format standards change with time, and that manufacturers may employ their own variations of industry format standards that may include in groove recording, the grouping of tracks in different frequency bands, and the elimination of the mirror mark area.

An exemplary format for a header area 12a, control area 15b, and a data area 12b satisfies the requirements of a standard put forth by ISO (International Standards Organization) and ANSI (American National Standards Institute). The header area 12a, which represents the first part of each logical sector, consists of fields 34 through 44, may be embossed on the media at the time of manufacture. In the header area 12a, SM field 34 signifies the beginning of a logical sector within a sector area 12. The new sector begins with VFO1 field 35, and extends into a trailing or following sector area 12 such as 12f (FIG. 1A). VFO1 field 35 is a first type of clock synchronizing field having a first pattern different from the patterns in field VFO2 and VFO3. Address mark AM 36 indicates the onset of a control field. IDCR 37 is a field which contains a first of three copies of the sector and track address information with its own independent CRC redundancy for detecting errors in the ID portion of field 37. VFO2 field 38 is another clock synchronizing set of signals followed by an address mark AM 39 which indicates a second of the control fields in this format. IDCR field 40 is a repetition of field 37 as a second copy of the sector address. VFO2 field 41 repeats the pattern in VFO2 field 38. Address mark field AM 42 has a repetition of fields 36 and 39 and signifies the onset of standing IDCR field 43, the third copy of the sector address information ID. PA field 44 is a postample to the control portion of a logical sector and terminates the sector area 12 for accommodating code frame boundaries and for closing the last CRC byte in field 43 at a boundary of a run length limited (RLL,) 2,7 (d,k) digital modulation code.

The control area 15b begins with an ODF field 50 which corresponds with the mirror mark 14 on the physical track and is followed by a GAP field 51. A FLAG field is used for control information. GAP field 53 follows FLAG field 52 which in turn is followed by ALPC field 54. ALPC field 54 is for measuring the light intensity of a laser beam scanning track 11.

In the data area 12b, a VFO3 field 30 has a signal format for synchronizing a PLL. A SYNC field 31 contains framing signals for identifying boundaries of 2,7 (d,k) code symbols. Following a DATA field 32 is a BUF field 33, which is an unrecorded buffer area for accommodating disk 10 rotational speed variations from one device or recorder to another device or recorder.

Referring now to FIGS. 1B and 2B, the disk 10 includes disk oriented controls and formats that provide information about the disk to a host data processing system. A phase encoded portion (PEP) 58 is located at the inner radial position of the disk 10. The PEP 58 is embossed or otherwise non-erasably written on the disk 10 at the time of manufacture for indicating the format and recording characteristics of the signals on the disk 10, including information about the Hard-WORM encoded nature of the disk. System formatted portions (SFP) 69 replicate the PEP 58 information, plus other system information, at both an inner and outer radial position of the disk 10. The PEP can be read and scanned by any device without track following because the radial dimension is substantially greater than that of the track 11. The PEP 58 has several fields (defined by ANSI standards), including a media field MED 59 which defines the type of modulation used for recording signals, track following servo recording methods, interleave of the sectors for rotational efficiency, sectors per track, nominal baseline reflectance, signal amplitude and polarity for user recorded data, maximum read power and other operational characteristics. A TYPE field 60 indicates the type of media disk 10 represents. In the past, encoding included a separate identification for read only media (ROM) disks, in which all of the information is embossed on the disk, write-once read many (WORM) disks capable of ablative recording, rewritable or magneto-optic (MO) media capable of erasure and rewriting, and Continuous Composite Write-once (CCW) media. In accordance with the present invention, the TYPE field 60 is encoded with a new Hard-WORM media type identifier.

Referring now to FIG. 3, a magneto-optical (MO) disk drive 70 is adapted for reading and writing Hard-WORM optical disk 10 in accordance with the present invention. The MO disk drive 70 is otherwise conventional in all respects. A read/write (R/W) control unit 72 provides control and data signals to a read/write (R/W) head unit 74 to operate the same in both read and write modes depending on the command issued by a controller 76. The controller 76 provides a command interface between the disk drive 70 and a host data processing device 78, such as a computer, via a bus connection 79. The R/W head unit 74 reads from and writes to the disk 10 which is mounted within the disk drive 70 on a drive spindle 80 powered by a drive motor 82. The R/W head unit includes a conventional diode laser optical system and a power control unit 84 that monitors laser power and deactivates laser emissions from the R/W head if necessary. The R/W control unit 72 includes a microprocessor 86 containing a plurality of command registers 88, a ROM memory 90 containing microcode instructions (i.e., the drive firmware), volatile RAM memory 92 and for storing data and control signals, and other information required for drive operations, and a hardware logic section 94 for controlling drive operations in accordance with the present invention.

The TYPE field 60 of disk 10 (see FIG. 1B) allows easy detection of the media type in both conforming (Hard-WORM enabled) and nonconforming drives. If the disk 10 is mounted on a nonconforming drive, the drive firmware will not be able to recognize the Hard-WORM type identifier in the TYPE field 60 will cause the disk to be ejected. It would be possible, however, to modify the firmware in a nonconforming drive so as to ignore the media type identifier and allow updates to data on the disk 10. Such updates would not ordinarily be detectable by a conforming drive subsequently reading the disk. For that reason, the present invention further contemplates uniquely formatting the sector header area 12 and/or the data recorded in various fields of the sectors on the disk 10 so as to render the disk unreadable by a nonconforming drive. Several alternatives embodiments may be implemented. In one embodiment, a unique format is employed for the ID fields IDCR 37, 40 and 43 in header area 12a. Thus, the standard sector ID information about track address, logical sector address, and other information contained therein is arranged differently so as to be unintelligible to a nonconforming drive. Similarly, the DATA field 32 in data area 12b, could be uniquely formatted so as to be unintelligible to a nonconforming drive.

It does not matter how the formats in the sector ID or data areas are changed because merely the fact of their scrambling from the format expected by the nonconforming drive is sufficient to preclude processing of the disk 10 by the nonconforming drive. Several approaches are preferred, however. If mark detection and RLL decoding are performed in the R/Wcontrol control unit 72, scrambling can be accomplished by 1) changing the format of the address marks, 2) changing the RLL decoding, 3) changing the order of the bits sent to certain fields or by selectively inverting certain bits in those fields, 4) swapping the CRC bytes with two of the three physical ID bytes, and 5) and changing the CRC coding. The unique header area 12a can be written or embossed at the time of manufacture. The R/W control unit hardware logic 94 contains the information for deciphering the unique header area 12a when they are read from the disk 10.

While the foregoing scrambling methods work well, it may be desirable to allow the use of industry standard controllers, which have mark synchronization circuitry, RLL, decoders and sector address comparison capability embedded therein. A preferred way to accomplish this is to use the standard sector address format but slip the address by one or more read clocks relative to the address marks AM 36, 39 and 42 in header area 12a. The R/W control unit hardware logic 94 in the drive 70 then descrambles the sector address by suppressing the same number of read clocks from the PLL, output stream.

The foregoing, approach to tamper resistance is a key improvement over CCW technology. The CCW formatting standard for the header area and data fields is the same as the rewritable standards. As previously stated, flags are used to indicate the presence of WORM sectors. Thus, intentional, undetected data update is relatively easy for CCW media by making simple modifications to the drive firmware, and even accidental, undetected data updates are possible. Undetected data updates for Hard-WORM media, such as the disk 10, would require a major hardware development effort to decipher the formatting. Accidental, undetected data update of Hard-Worm media would be impossible.

Figure 4:
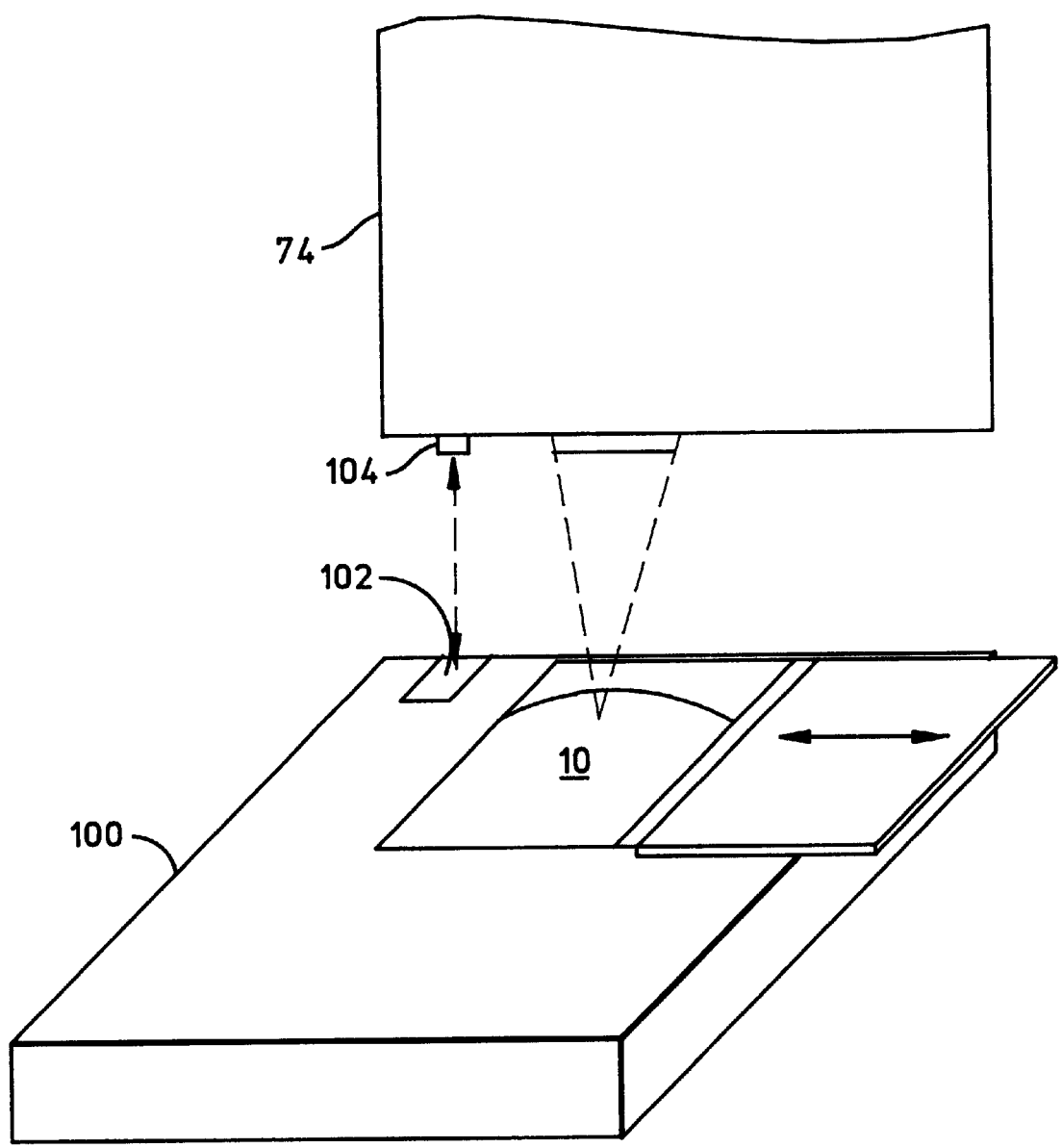
FIG. 4 is a projection view of a cartridge for containing the disk of FIG. 1.

To further improve tamper resistance when a conforming drive is used to read the disk 10, a hardware disabled erase function is implemented to disable the erase function of the drive 70 when Hard-WORM media is detected by the drive. All aspects of this feature are controlled by drive hardware logic 94 without any firmware interaction or control. The Hard-WORM detection mechanism can be implemented in two different ways. In one embodiment, a unique cartridge feature can be provided that is detectable by a drive sensor. As shown in FIG. 4, a cartridge 100 that holds the disk 10 is manufactured with a break-away tab 102 that is sensed by a sensor 104 in the R/W head unit 74. Other physical characteristics, such as an aperture in the cartridge 90 that is either covered or uncovered, or some characteristic of the disk 10 which could be detected by a drive sensors could also be used. When such a feature is detected, the hardware logic 94 in the R/W control unit 72 would cause the control unit to automatically disable the drive erase hardware.

In a second and more preferred embodiment, the above-described unique header area 12a format can be used such that the drive hardware must be set uniquely to read the formatted fields. This unique hardware mode would also cause the erase function to be disabled. In other words, the drive hardware logic would disable the erase function when in the mode to read the Hard-WORM sectors. With the foregoing erase-disable function in place, a key improvement is provided over CCW technology. In contrast to CCW recording wherein the erase and update functions are controlled by having the drive firmware sense flags in the WORM sectors, intentional tampering is much more difficult for Hard-WORM media wherein hardware control is used to prevent unauthorized write operations.

With the erase function disabled, calibration of the laser write power requires a special process because MO writes require that the media be erased prior to writing. This write calibration process on CCW media may be performed repeatedly on any sector on the media. The write calibration process on ablative WORM media is performed on a much more limited basis (for example, for limited error scenarios) because a sector is permanently consumed when used for this process. There are two embodiments for performing the calibration process on Hard-WORM media. In a first embodiment, write calibrations are performed in disk areas that become permanently consumed thereby. Thus, such calibrations arc limited in a manner similar to ablative WORM media to minimize the amount of permanently consumed disk real estate. For the first and second generation of ablative WORM media, this calibration has been performed in the manufacturing zone at the inner diameter of the disk. For the most recent generation of ablative WORM media, the calibration is performed at the edge of each band in the user's data area in a portion shared by both the calibration process and the defect replacement (spare sector) process, explained in detail below.

In a second and preferred Hard-WORM calibration process embodiment, provision is made for the use of an ISO standard sector format in the manufacturing zone control sectors and a unique sector format in areas containing user data. The erase function is only disabled when the hardware detects the uniquely formatted, header area 12a user data sectors. Write calibration would then be performed in a manner similar to MO rewritable (and CCW) media with virtually unlimited re-use of the manufacturing zone sectors. Other types of control sectors could also be maintained on the media such as lists of defective sectors and their assigned replacements, lists of the first available blank sector in each user area, and lists of the first available blank sector in each spare area. Each of these or any similar control sectors could be implemented in rewritable sectors using the embodiment described above for write calibration sectors.

Figure 5:
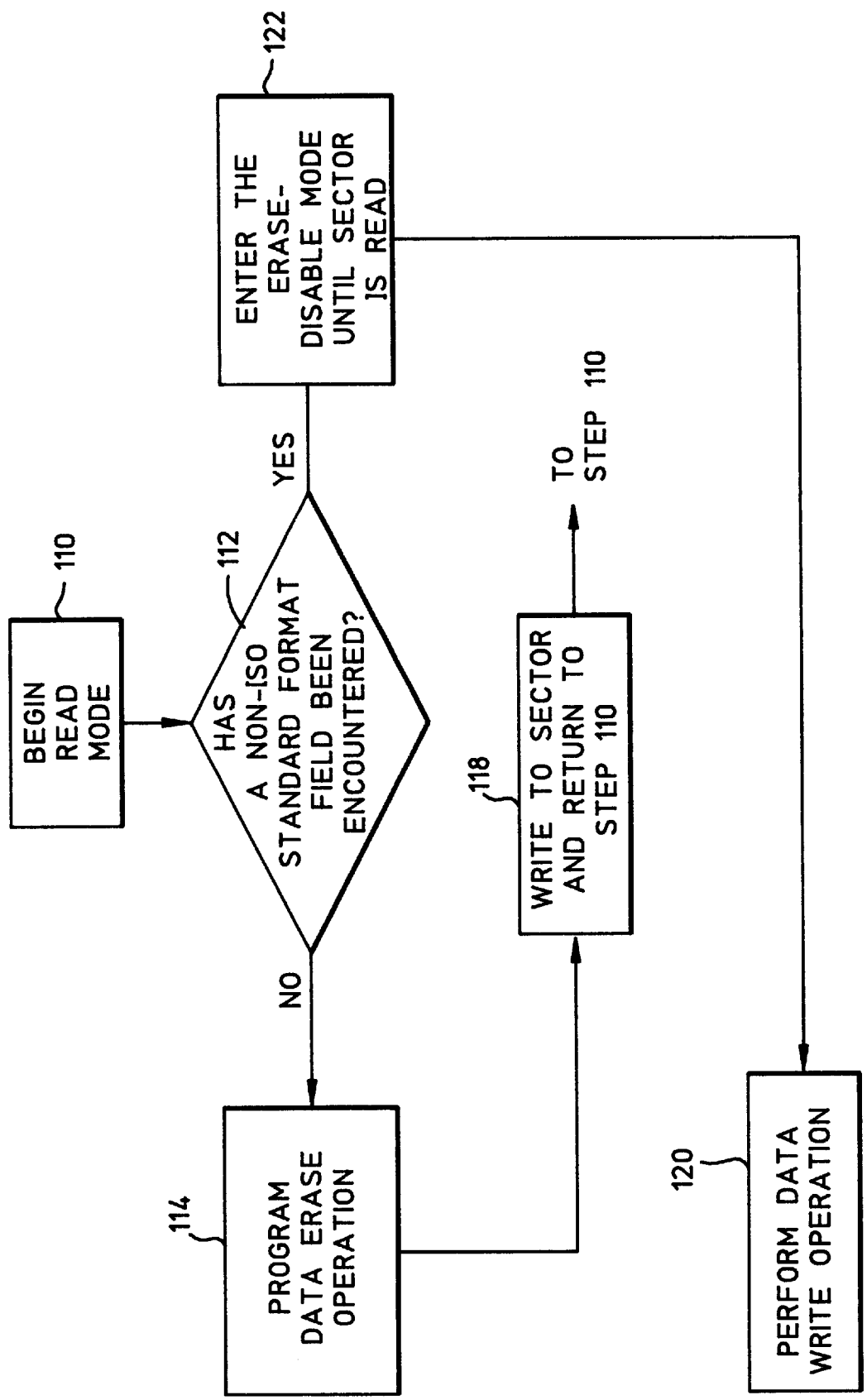
FIG. 5 is a flow diagram showing, a procedure in accordance with the present invention for preventing illegal writes to Hard-WORM sectors on the disk of FIG. 1.

FIG. 5 illustrates the processing steps performed by the R/W control unit 72 under the control of its hardware logic 94 to determine whether erase mode disabling should be invoked. When a data write operation is requested, the process must read the sector header area 12a of the sector to be written. The process thus begins with the commencement of a read mode in step 110. As the header area 12a of the sector is read, the process tests in step 112 whether a uniquely formatted header area 12a field has been encountered indicating that the sector is a Hard-WORM sector. If not, a data write operation is commenced by first invoking a data erase operation in step 114 and the process performs the data write operation using standard rewritable sector formatting, and then returns to step 110 via step 118. If in step 112, the process determines the sector is a uniquely formatted header area 12a, meaning that it is a Hard-WORM sector containing user data, the process invokes the erase disable mode in step 122 and then performs the write in step 120.

There are several ways to implement the erase mode disable function. In a first embodiment of such an operation the RUMS control unit 72 is forced to a write bias mode (low power mode that maintains tracking) upon encountering a uniquely formatted sector. In a second embodiment, the laser power control unit 84 is set to trigger an automatic hardware shut-off if the average laser power exceeds that expected for a write of the highest mark density pattern possible with the (1,7) code. This is a fairly high density (1000000010) and can be repeated for up to 30 bytes (the resyncbronization interval), which is ⅞ of the average mark write power. In a third embodiment, the command registers of the R/W control circuit microprocessor can be imaged by the instruction decoder and decoding can be disabled if an erase operation is programmed.

To provide further data security, it is desirable to address the scenario where a conforming drive is used to make an undetectable update of the Hard-WORM disk via copying the entire disk to another disk, bulk erasing the original, reformatting it, and re-recording the data with selected records modified. This would result in the undetected update of a serialized cartridge. A preferred solution is to permanently mark the disk 10 via a laser beam focused at the recording layer. In one embodiment, a much higher power laser is used to record the mark. In another embodiment, the usual laser diode is applied but the RPM is slowed dramatically. Either way, a permanent marking of the disk can be achieved. The permanent marking can be used as a flag that indicates the disk has been written and that formatting and re-recording are not permitted. Writing the permanent mark can be made the last step of the format process, and checking for the permanent mark can be made the first step when starting the format process, such that if the mark is already present, the format is aborted. If the permanent mark has been destroyed to allow formatting, then all write operations are inhibited and an error is flagged indicating that it appears the cartridge has been altered. Thus, like CCW WORM, the Hard-WORM drive will support a format of the media using the SCSI Format Unit command. The CCW standard allows support of a one-time format of CCW media including erasure of each data sector. Alternatively, for Hard-WORM media, the media manufacturer could preformat the media including erasure of the data area.

If the drive is powered by a variable speed motor, if the RPM could be reduced by a factor of 10 to 100, and if the laser could remain focused to read headers while recording permanent marks to certain sectors of the disk, the permanent marks could be sensed and used as a flag indicating that if the sectors are written, do not re-record or allow formatting of the disk. If this non-standard ablation/plastic bubbling cannot be controlled adequately for actual recording of individual marks as in a data field, they can be recorded in a much less dense way such the phase encoding of the PEP zone so that this area is more than a flag region, but contains data such as the serial number of the disk and the day and time it was formatted.

While various embodiments have been disclosed, it should be apparent that many variations and alternative embodiments would be apparent to those skilled in the art in view of the teachings herein. For example, It is understood, therefore, that the invention is not to be in any way limited except in accordance with the spirit of the appended claims and their equivalents.

We claim:

1. A data storage system comprising:
   a magneto-optical storage disk, comprising;
   machine-readable indicia identifying the disk as Simulated Write-Once Read Many (WORM) type;
   disk layout arranged for recognition by read/write hardware operating under one or more industry standards;
   information stored on the disk pursuant to the disk layout, where selected portions of the information are scrambled to render the information unreadable by read/write hardware operating according to said industry standards;
   a motor coupled to said disk;

a laser read/write (R/W) head unit for reading and writing information in said sectors; and a read/write (R/W) control unit programmed to disable write operations on the disk responsive presence of the machine-readable indicia.

2. The data storage system of claim 1 where the scrambled portions comprise one or more formatted sector area fields and said R/W control unit is programmed further for disabling erasure in sectors responsive to presence of one or more said uniquely formatted sector area fields.

3. The data storage system of claim 1 wherein said scrambled portions comprise one or more uniquely formatted sector area fields that include header area fields manufactured using a unique ID format that does not comply with industry standard formats for re-writable magneto-optical media.

4. The data storage system of claim 1 wherein said scrambled portions comprise one or more uniquely formatted sector area fields including data fields written using a unique data format that does not comply with industry standard formats for re-writable magneto-optical media.

5. The data storage system of claim 1 wherein said scrambled portions comprise one or more uniquely formatted sector area fields including sector header area fields containing sector addresses that are slipped by one or more read clocks relative to an adjacent address mark.

6. The data storage system of claim 1 wherein said scrambled portions comprise one or more uniquely formatted sector area fields including address mark fields containing uniquely formatted address marks.

7. The data storage system of claim 1 wherein said scrambled portions comprise one or more uniquely formatted sector area fields including fields recorded using a unique RLL encoding scheme that does not comply with industry standard RLL formats for re-writable magneto-optical media.

8. The data storage system of claim 1 wherein said scrambled portions comprise one or more uniquely formatted sector area fields including fields recorded with bits written out of sequence.

9. The data storage system of claim 1 wherein said scrambled portions comprise one or more uniquely formatted sector area fields including fields with bits that are selectively inverted.

10. The data storage system of claim 1 wherein said scrambled portions comprise one or more uniquely formatted sector area fields including cyclic redundancy (CRC) fields containing bytes that are swapped with bytes in sector ID fields.

11. The data storage system of claim 1 wherein said scrambled portions comprise one or more uniquely formatted sector area fields including fields written using a unique cyclic redundancy code (CRC) that does not comply with industry standard CRC formats for re-writable magneto-optical media.

12. The data storage system of claim 3 wherein said R/W control unit is programmed for disabling erasure in sectors containing said uniquely formatted ID fields by entering a write bias operational mode in response to a uniquely formatted ID field.

13. The data storage system of claim 3 wherein said R/W control unit is programmed for disabling erasure in sectors containing said uniquely formatted header area fields by disabling power to said laser R/W unit in response to a uniquely formatted ID field being sensed and to said laser power exceeding a predetermined level.

14. The data storage system of claim 3 wherein said R/W control unit is programmed for disabling erasure in sectors containing said uniquely formatted header area fields by said R/W control unit disabling erasure in response to an erase command and to a uniquely formatted ID field.

15. The data storage system of claim 1 wherein said disk is permanently marked by said laser following said disk at the completion of a formatting process in order to prevent subsequent tampering.

16. A data storage system comprising:

a magneto-optical storage disk having a plurality of sectors thereon and containing one or more fields written in an industry standard format and one or more uniquely formatted header area fields to provide an indication that said fields are Write-Once Read Many (WORM) fields, the uniquely formatted header area fields being structured to fail access attempt by read/write hardware operating according to said industry standard;

a motor for rotating said disk at an operational rotational speed;

a laser read/write (R/W) head unit for reading and writing information in said sectors;

a read/write (R/W) control unit for controlling read and write operations on said disk in response to commands from an external data processing device, said R/W control unit including hardware logic uniquely set to read said one or more uniquely formatted ID fields in order to correctly interpret information contained therein; and said R/W control unit being still further adapted to disable erase in sectors containing said uniquely formatted ID fields in response to said hardware logic reading said uniquely formatted header area fields, but said R/W control unit being otherwise adapted to write data, including calibration sectors, defect lists, first available sector lists, and other information in sectors that do not contain uniquely formatted fields.

17. A simulated Write Once Read Many (WORM) magneto-optical storage disk having a plurality of sectors thereon, including machine-readable indicia designating the disk as being of simulated WORM type, disk layout arranged for recognition by read/write hardware operating under one or more existing industry standards, information stored on the disk pursuant to the disk layout, where selected portions of the information are scrambled to render the information unreadable by read/write hardware operating according to said industry standards, said optical storage disk being for use in a Hard-WORM data storage system having a motor for rotating said disk at an operational rotational speed, a laser read/write (R/W) head unit for reading and writing information in said sectors, and a read/write (R/W) control unit for controlling read and write operations on said disk in response to commands from an external data processing device, said R/W control unit including hardware logic uniquely set to read the information stored on the disk including the scrambled portions.

18. The system of claim 1, the scrambled portions comprising one of the following: header information, user data.

19. The system of claim 1, the read/write control unit being configured to scan each disk for a predetermined permanent-write mark, and upon finding the permanent-write mark disabling formatting of the disk.

20. The system of claim 1, the read/write control unit being programmed to read the scrambled portions of the disk.

21. The system of claim 1, the read/write control unit being further programmed, responsive to presence of the machine-readable indicia, to perform erase-disable operations comprising:

responsive to encountering the scrambled portions, placing the laser read/write head in a reduced power mode incapable of writing to the disk encountering uniquely formatted sector.

22. The system of claim 1, the read/write control unit being further programmed, responsive to presence of the machine-readable indicia, to perform erase-disable operations comprising:

responsive to the laser read/write head exceeding consumption of a prescribed maximum write power, disabling writes by the read/write head.

23. The system of claim 1, the read/write control unit being further programmed, responsive to presence of the machine-readable indicia, to perform erase-disable operations comprising:

reviewing read/write command registers and disabling instruction decoding if an erase operation is programmed.

24. A method of operating an optical disk read/write mechanism, comprising:

providing a magneto-optical data storage medium including:

machine-readable indicia identifying the disk as being Simulated Write-Once Read Many (WORM) type;

disk layout arranged for recognition by read/write hardware operating under one or more industry standards;

information stored on the disk pursuant to the disk layout, where selected portions of the information are scrambled to render the information unreadable by read/write hardware operating according to said industry standards;

coupling the disk to a read/write unit, and responsive to presence of the machine-readable indicia, the read/write unit disabling write operations to the disk.

25. The system of claim 1, the operation of disabling write operations comprising:

responsive to encountering the scrambled portions, the read/write unit entering a reduced power mode incapable of writing to the disk.

26. The system of claim 1, the operation of disabling write operations comprising:

responsive to the read/write unit exceeding consumption of a prescribed write power, disabling the write capability.

27. The system of claim 1, the operation of disabling write operations comprising:

reviewing read/write command registers and disabling instruction decoding if an erase operation is programmed.

28. The method of claim 24, the scrambled portion comprising one of the following: header information, user data.

29. The method of claim 24, further comprising:

the read/write unit scanning the disk or a predetermined permanent-write mark; responsive to finding the permanent-write mark, disabling formatting of the disk.

* * * * *

UNITED STATES PATENT AND TRADEMARK OFFICE
CERTIFICATE OF CORRECTION

PATENT NO.     : 6,272,086 B1                                           Page 1 of 1
DATED          : August 7, 2001
INVENTOR(S)    : Glen Alan Jaquette et al.

It is certified that error appears in the above-identified patent and that said Letters Patent is hereby corrected as shown below:

<u>Column 6,</u>
Line 24, delete the "," after with word "foregoing."

<u>Column 9,</u>
Line 4, insert the word -- to -- between "responsive" and "presence."

<u>Column 12,</u>
Line 27, delete the word "or" between "disk" and "a predetermined" and replace it with -- for. --

Signed and Sealed this

Twenty-fourth Day of September, 2002

Attest:

Attesting Officer

JAMES E. ROGAN
*Director of the United States Patent and Trademark Office*